United States Patent [19]
Zuber

[11] 3,724,027
[45] Apr. 3, 1973

[54] RESTRAINING PEN
[75] Inventor: Chauncey E. Zuber, St. Louis Park, Minn.
[73] Assignee: E. F. Zuber Engineering & Sales Co., Bloomington, Minn.
[22] Filed: Mar. 27, 1972
[21] Appl. No.: 238,281

[52] U.S. Cl. ................................................17/1 A
[51] Int. Cl. .....................................................A22b
[58] Field of Search..............17/1 A, 44; 119/96, 99

[56] References Cited
UNITED STATES PATENTS

| | | |
|---|---|---|
| 3,191,220 | 6/1965 | Lunde ......................................17/1 A |
| 1,547,520 | 7/1925 | Pancero et al..........................17/1 A |
| 1,021,523 | 3/1912 | Hoeckelberg .........................17/1 A |
| 1,646,934 | 10/1927 | Schmidt..................................17/1 A |

Primary Examiner—Louis G. Mancene
Assistant Examiner—D. L. Weinhold
Attorney—L. Paul Burd et al.

[57] ABSTRACT

A restraining or "knocking" pen for conveniently and safely confining and restraining a livestock animal for humane slaughter. The pen is characterized by automatically locking guillotine-type restraining means for holding the head of the animal and drop-away floor and releasable side panel to free the animal from the pen after stunning.

9 Claims, 12 Drawing Figures

PATENTED APR 3 1973 3,724,027

RESTRAINING PEN

This invention relates to a restraining or "knocking" pen for safely and conveniently restraining livestock animals for humane slaughter. The device is particularly adapted for use by small slaughter houses, custom slaughterers, locker plants, and the like. The device is designed to function with maximum regard for the safety of the operator consistent with humane handling of the animal to be slaughtered. It is of simple, durable construction. It is designed for easy maintenance of state and federal sanitation standards.

The invention is illustrated in the accompanying drawings in which.

Figure 11:
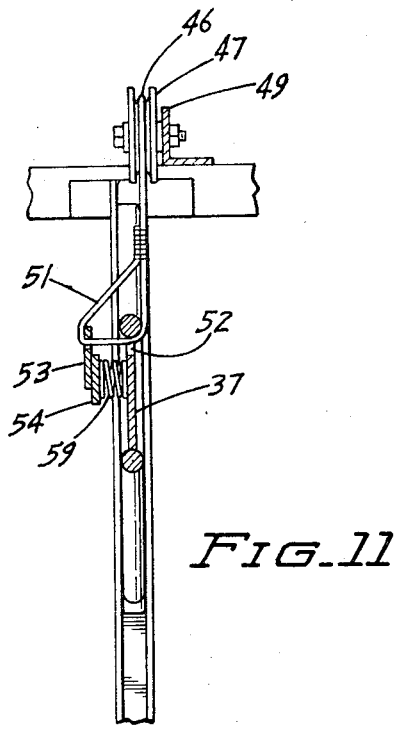
Figure 4:
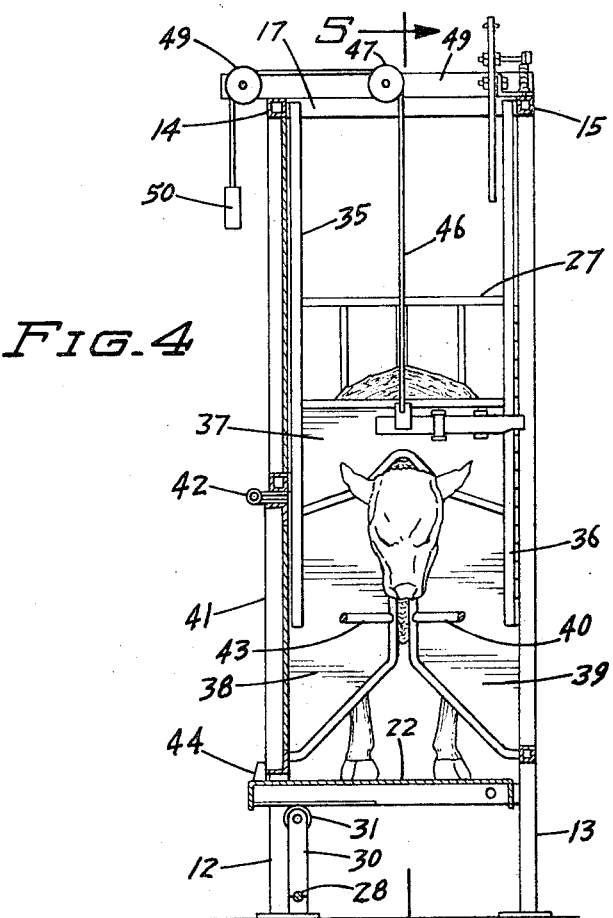
FIG. 4 (sheet 3) is a similar end elevation is section showing the head gate portion of the restraining means lowered to hold an animal.
Figure 6:
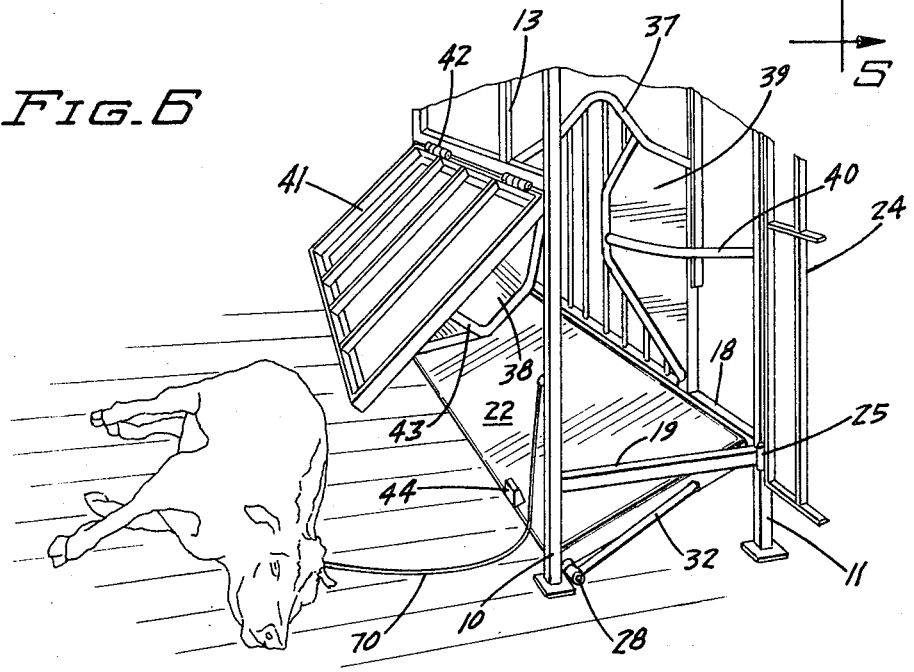
FIG. 6 (sheet 3) is a fragmentary perspective view of the pen after stunning and release of the animal.
Figure 5:
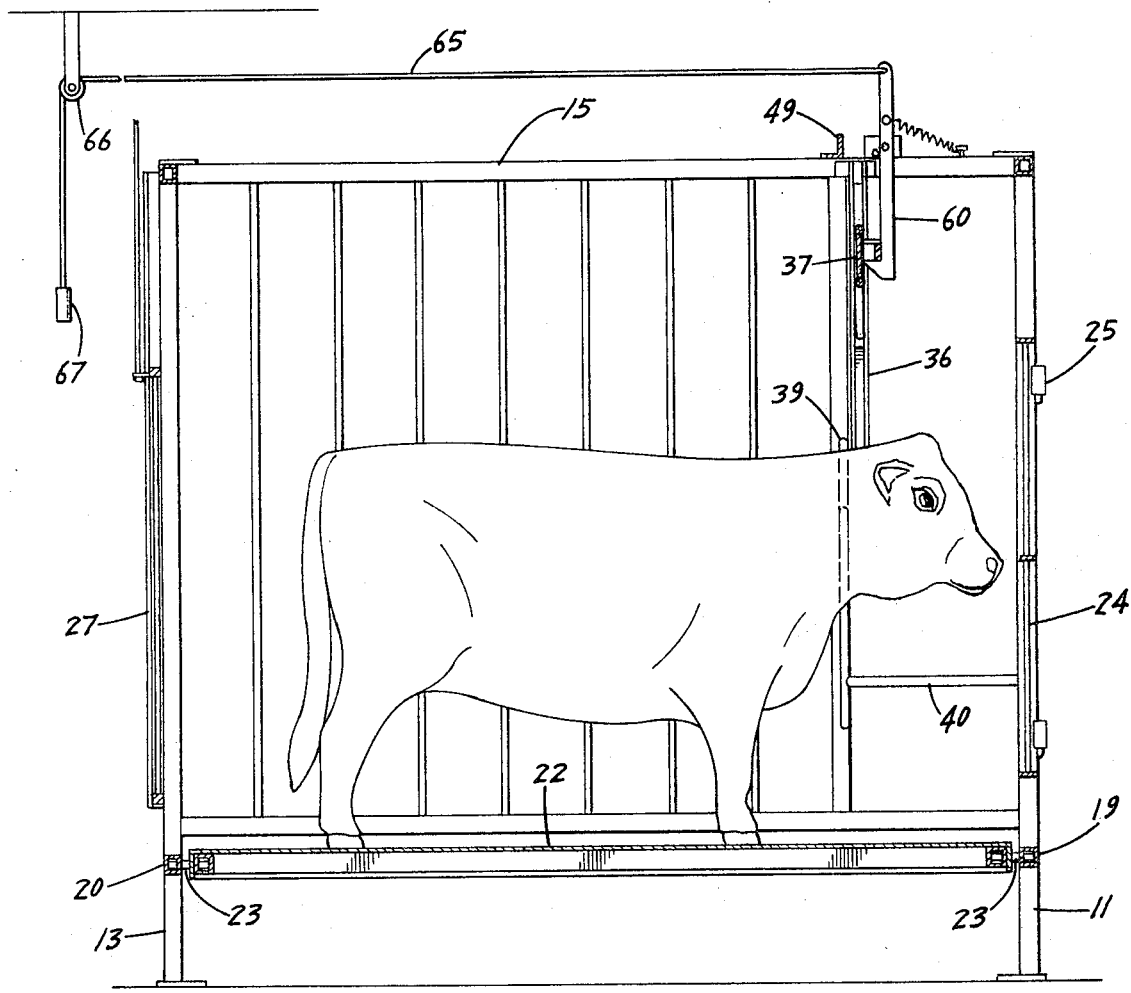
FIG. 5 (sheet 4) is a longitudinal vertical section on the line 5—5 of FIG. 4 and in the direction of the arrows.
Figure 12:
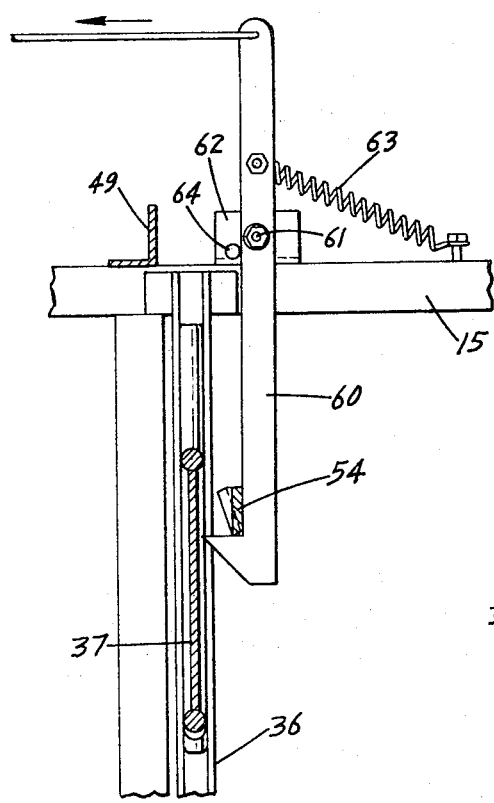
Figure 10:
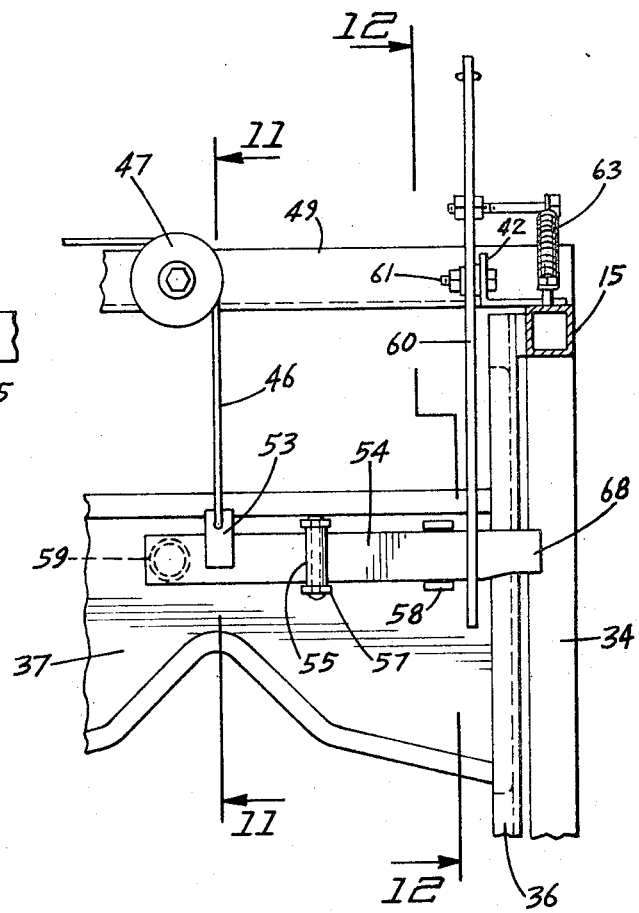
FIG. 10 (sheet 5) is a fragmentary elevation on an enlarged scale and partly in section showing the head gate in elevated position and showing latching means for holding the head gate elevated.

FIG. 11 (sheet 3) is a fragmentary longitudinal vertical section on the line 11—11 of FIG. 10 and in the direction of the arrows; and FIG. 12 is a similar section on the line 12—12 of FIG. 10 and in the direction of the arrows.

Referring to the drawings, the retaining or "knocking" pen is generally a rigid rectangular cage-like structure defined generally by four vertical corner posts 10–13 jointed together at the top by a pair of horizontal longitudinal members 14 and 15 and a pair of horizontal transverse members 16 and 17, all welded or otherwise rigidly secured together.

The upright corner posts are likewise rigidly secured together by means of a horizontal longitudinal member 18 extending between corner posts 11 and 13 and a pair of transverse horizontal members 19 and 20 extending between corner posts 10 and 11 and between corner posts 12 and 13, respectively, all spaced upwardly from the floor between about 12 and 18 inches. Corner posts 10 and 12 are connected by a horizontal longitudinal member 21 disposed intermediate of the heights of the corner posts approximately 3½ to 4½ feet from the floor. All of the structural members heretofore described are desirably formed from tubular steel.

A pen floor or platform 22 is disposed horizontally between the corner posts spaced about 12 to 18 inches above the floor of the room in which the pen is located. Platform 22 is supported on one side on a pair of stub shafts 23 journaled in bottom cross members 19 and 20 for limited pivotal rotation of the platform as hereinafter described in detail.

A front gate 24 is hung between front corners posts 10 and 11 hingedly attached at 25 to post 11 and having latching means 26 for engagement with post 10. A vertically movable rear gate 27 of conventional construction and operation is hung between vertical channel guide members supported on posts 12 and 13. The vertical guide members desirably extending above the rear of the pen to maintain alignment of gate 27. The rear gate is raised by a rope (not shown) extending around a suitably located pulley. The gate may be maintained in elevated position by tying or wrapping around a cleat or similar projection.

Figure 1:
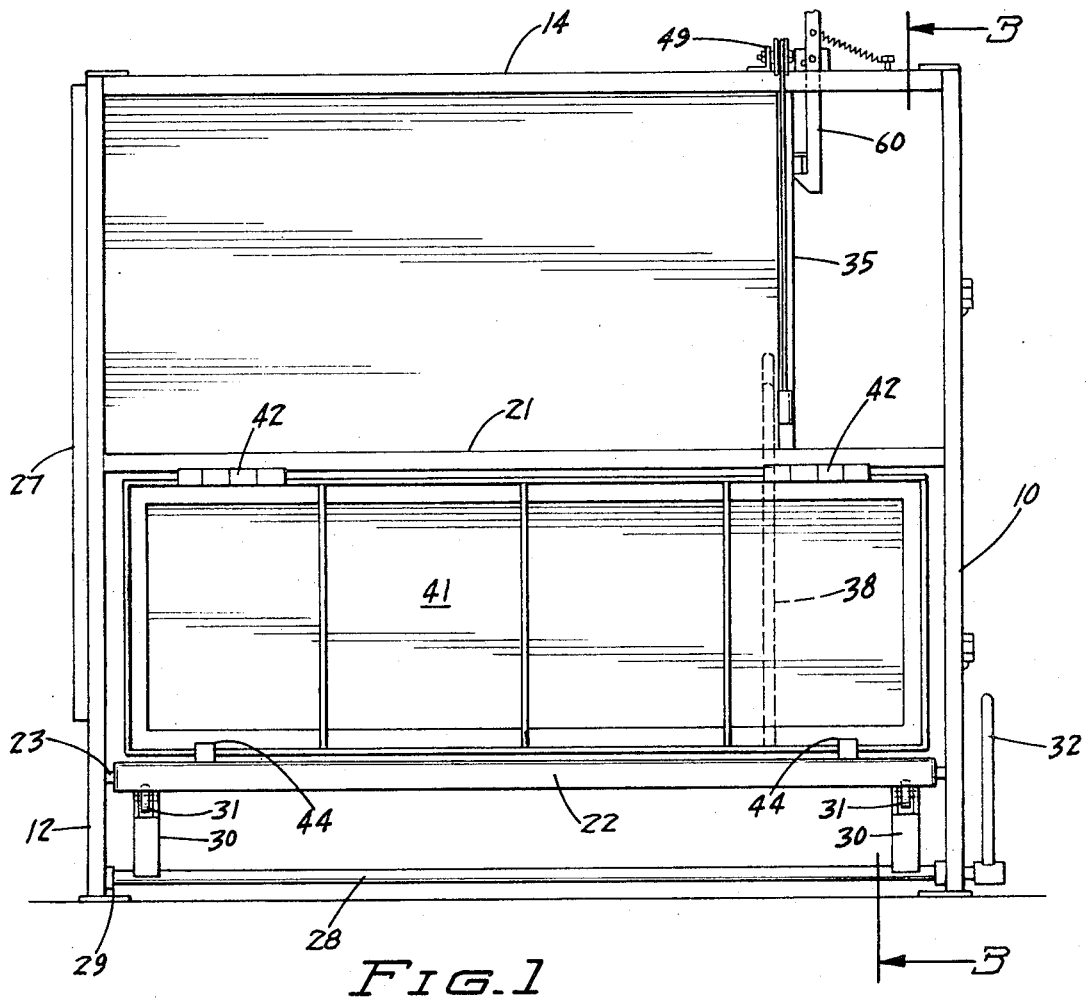
FIG. 1 is a side elevation of a left-hand model of the pen according to the present invention, shown with floor and side panel in place.
Figure 9:
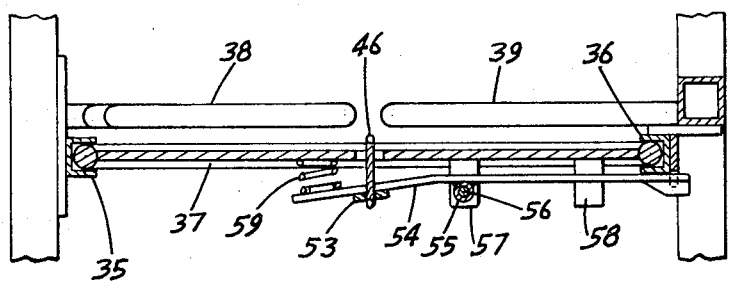
FIG. 9 (sheet 1) is a transverse horizontal section on the line 9—9 of FIG. 7 and in the direction of the arrows.
Figure 2:
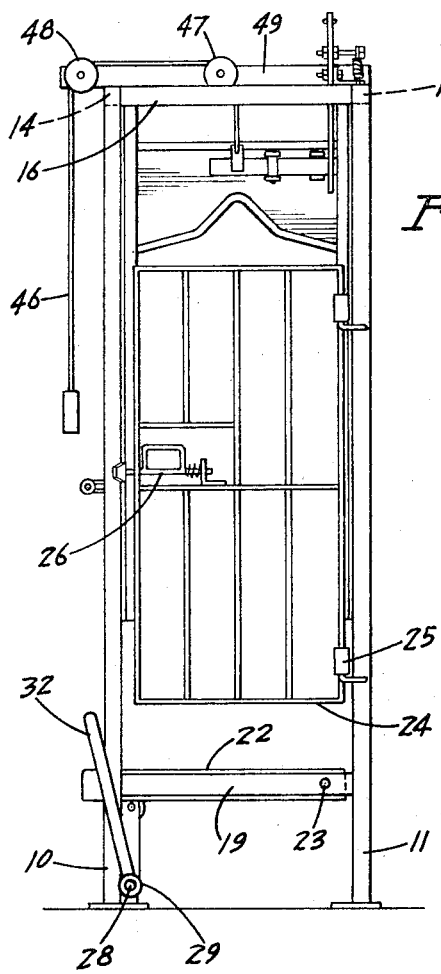
FIG. 2 (sheet 2) is an end elevation of the pen of FIG. 1 shown with the head gate portion of the restraining means elevated.
Figure 3:
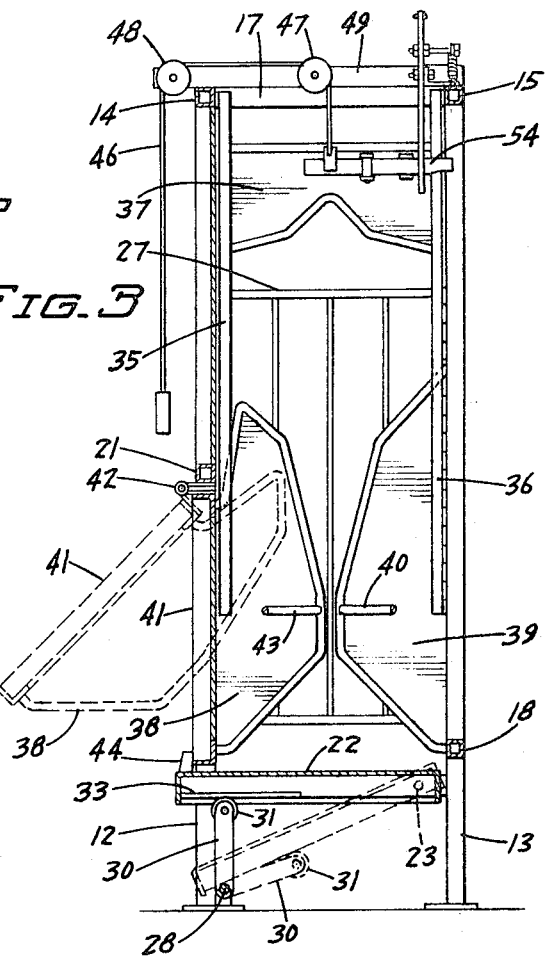
FIG. 3 is an end elevation in transverse section taken on the line 3—3 of FIG. 1 and in the direction of the arrows.

A longitudinal horizontal shaft 28 spaced just off the room floor is journaled in bearings 29 carried by corner posts 10 and 12. A pair of rigid parallel arms 30 are each secured at one end to shaft 28 adjacent the opposite ends thereof. The other ends of arms 30 are bifurcated and rollers 31 are journaled for rotation therein. A lever 32 is secured to the front end of shaft 28, keyed thereto to rotate the shaft. Lever 32 is removable. Arms 30 are normally vertically disposed just past dead center. Rollers 31 bear against wear plates 33 on the bottom surface of platform 22. When shaft 28 is rotated by movement of lever 32 to the right, as best seen in FIG. 3, platform 22 pivoted along one edge on stub shafts 23 rotates downwardly until its free edges engages the floor to discharge the stunned animal from the pen, as described hereinafter.

The interior of the pen is divided into two portions, a relatively large rearward area adapted to receive the legs and body of the animal to be slaughtered and a relatively smaller forward area adapted to receive the head of the animal. Vertical post 34 extends between right hand horizontal members 15 and 20 parallel to corner posts 11 and 13 but disposed much closer to front post 11. A pair of vertical guide members extend vertically downwardly from the inside edges of top horizontal members 14 and 15 at the division between the two pen areas. Guide members 35 and 36 are channel members disposed parallel to one another and facing inwardly. A guillotine-like head gate restrainer member 37 is disposed to move vertically within guide members 35 and 36. The pen areas are further separated by a pair of wing-like wall members 38 and 39 which, in cooperation with head gate 37, form the head restraining means and separate the areas of the pen.

Wall members 38 and 39 extend vertically and inwardly from the inside walls of the pen toward the center but with their edges spaced slightly apart. The upper edges taper inwardly and downwardly to form a "V" for receiving the neck of the animal to be slaughtered. Each divider wall is desirably formed of steel plate edged with steel rod or tubing so as to minimize discomfort and possible injury to the animal.

The wall members are displaced slightly from the plane of the head gate to permit overlap of the head gate with the members when the head gate is lowered. Wall member 39 is rigidly secured to the right side wall of the pen and a forward brace 40 extending to corner post 11 is desirably provided for additional strength.

The wall space generally defined between horizontal member 21, the top free edge of platform 22 and the lower ends of corner posts 10 and 12 is occupied by a movable wall panel 41 hinged at 42 at its top edge for limited outward pivotal movement. As best seen in FIG. 3, wall member 38 is rigidly secured to the inside surface of panel 41 for pivotal movement therewith. Wall member 38 is likewise provided with a forwardly extending brace 43 extending to the forward edge of panel 41. Panel 41 is locked in place by means of a pair of tabs 44 projecting from the side edge of platform 22 when the platform is in its raised position.

Head gate 37 is vertically movable in the channels of guides 35 and 36. It is formed from steel plate and has a shallow inverted V configuration along its lower edge and is faced with steel rod or tubing to minimize discomfort and injury to the animal. The area defined generally by the V formed between wall members 38 and 39 and the inverted shallow V of the head gate receives and restrains the neck of the animal to be stunned. Head gate 37 is suspended from a cable 46 passing over pulleys 47 and 48 journaled for rotation and supported by a cross member 49 spanning top horizontal longitudinal members 14 and 15. One end of cable 46 terminates in a weighted handle 50 outside of the pen.

The other end terminates in a loop 51, best seen in FIG. 11. The loop extends through a hole 52 in the head gate and a hole in an eye member 53 welded or otherwise rigidly secured to a horizontal latch bar 54. Latch bar 54 is welded to a vertical tube 55 for slight pivotal rotation about a pin 56 held between a pair of parallel vertically spaced apart lugs 57 projecting from the forward face of head gate. Another pair of vertically spaced, parallel lugs 58 spaced horizontally from tube 55 embraces and guides latch bar 54 in its slight pivotal movement. The inner end of latch bar 54 is bent slightly forwardly and the latch bar is spring loaded for normal latching position by means of a coil spring 59.

The head gate 37 is held in raised position by a hook member 60 pivotally attached at 61 to a bracket 62 carried by longitudinal horizontal top member 15. Hook member 60 may be held by gravity or may desirably be spring loaded by means of coil spring 63 to hold the hook against stop pin 64 in normal locking position for engagement with latch bar 54. A line or cable 65 from the top end of hook 60 extends rearwardly over a pulley 66 suspended, for example, from the ceiling some distance rearwardly of the back end of the pen. The operator, by pulling on handle 67 and cable 65 after driving the animal into the pen, releases the head gate by disengaging hook 60 from latch bar 54.

Figures 7, 8:
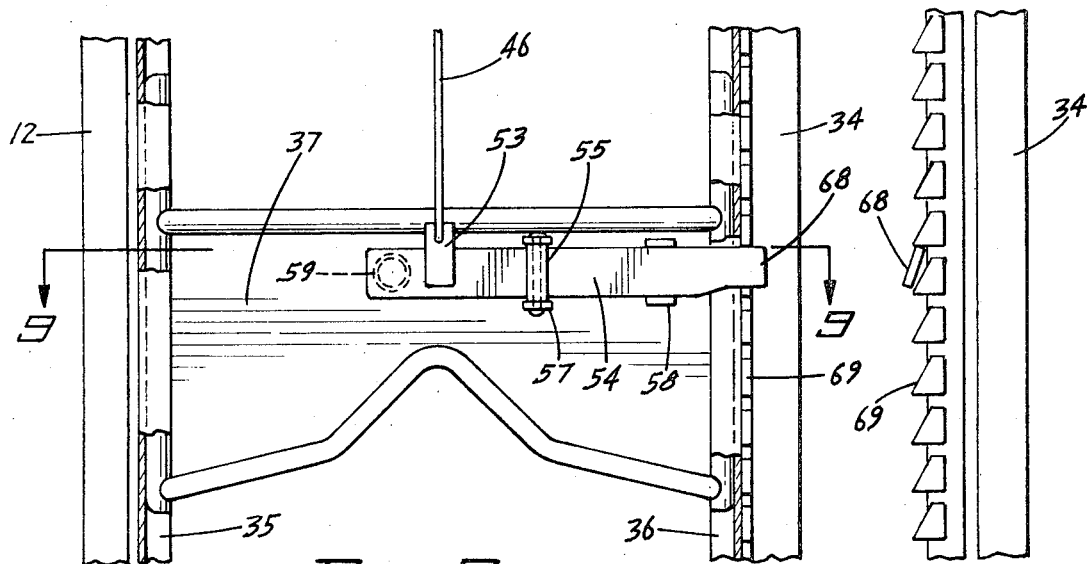
FIG. 7 (sheet 2) is a fragmentary elevation on an enlarged scale, partly in section and showing details of construction of the head gate portion of the restraining means.
FIG. 8 is a fragmentary side elevation of the locking means for the head gate.

The gate descends by gravity guided by channels 35 and 36 until it comes to rest on the neck of the animal whose head protrudes between the edges of wall members 38 and 39. The head gate locks in place so as not to be raised if the animal attempts to raise its head by virtue of the outer end 68 of latch bar 54 engaging any one of a row of vertically spaced apart teeth 69 carried by a vertically extending toothed bar supported by the guide member 36. The end 68 of latch bar 54 is desirably twisted slightly out of vertical, as best seen in FIG. 8, to better engage the teeth 69.

After the animal is stunned and released from the pen by virtue of platform 22 pivoting downwardly and wall panel 41 pivoting outwardly, the head gate is raised by pulling on handle 50 and cable 46. This has the effect of narrowing loop 52 applying force on eyelet 53 against the pressure of spring 59 slightly compressing the same. This causes the latch bar 54 to pivot sufficiently on pin 56 to release the end 68 of the latch bar from whatever tooth 69 it has been in engagement with and hold the latch bar free of the other teeth as the head gate is raised.

The pen is normally used in conjunction with a narrow chute through which the animals to be slaughtered are driven. The animal enters the rear of the pen in the usual way and seeing light at the other end trys to walk through. When the animal puts his head in the V space between the wall members 38 and 39, the operator pulls on cable 65 to unlatch the head gate 37 which then drops and automatically locks in place to securely hold the animal's head. The operator then drops the rear gate 27 behind the animal for extra safety.

Moving to the front of the pen, the operator opens front gate 24, stuns the animal with a humane stunner and loops safety chain 70, which is secured to corner post 10, around the animal's neck. The operator then trips the pen by means of lever 32 to drop the platform 22 and release the side panel 41 as the stunned animal rolls clear of the pen so its shank can be easily shackled. The animal is still securely tied by means of chain 70 to prevent his getting up and charging if improperly stunned. This eliminates the need for fencing around the dry landing area.

When the animal is shackled, chain 70 is removed from its neck. Side panel 41 and platform 22 are restored to their normal positions. Front gate 24 is closed. The operator pulls on cable 46 to unlatch the head gate and raise it until hook 60 engages latch bar 54 to hold the head gate in elevated position. The rear gate is raised and the pen is ready to receive the next animal.

The pens may be made for either left hand discharge of the stunned animal, as illustrated, or in mirror image, for right hand delivery. The side panels may be formed from spaced apart bars or from plate, as desired. All crevices are desirably sealed, as by hot dip galvanizing after fabrication, for easy cleaning and maintenance of state and federal sanitation standards.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A restraining pen for humane slaughter of livestock animals comprising:
   A. a pair of spaced apart confining vertical side walls;
   B. an elongated horizontal animal supporting platform disposed between the side walls and elevated above the floor level of the area in which the pen is used;

C. means for pivotally supporting one side edge of said supporting platform;

D. means for releasably supporting the other side edge of said supporting platform;

E. elongated panel means in the lower portion of said side wall which is adjacent to the releasably supported edge of the platform, said panel means being pivotally mounted along its upper edge for outward swinging movement; and F. head restraining means for an animal adjacent to one end of the pen.

2. A restraining pen according to claim 1 further characterized in that said head restraining means comprises:

A. a pair of transverse vertical wall members lying generally in the same plane and extending inwardly from the opposite side walls;

B. a V notch formed between the upper edges of said wall members;

C. a head gate member vertically movable in a plane parallel and immediately adjacent to the plane of said wall members; and D. an inverted shallow V notch formed in the lower edge of said head gate member.

3. A restraining pen according to claim 2 further characterized in that:

A. one of said transverse vertical wall members is rigidly secured to said movable panel means for movement therewith; and B. the other of said wall members is rigidly secured to the opposite side wall.

4. A restraining pen according to claim 2 further characterized in that:

A. releasable lock means are provided to hold said head gate member in elevated position; and B. further releasable latch means are provided to hold said head gate member against upward movement when lowered.

5. A restraining pen according to claim 4 further characterized in that said lock means comprises a horizontally extending, pivotally mounted latch bar on said head gate engageable with a vertically extending, pivotally mounted hook member supported from the top of the pen.

6. A restraining pen according to claim 5 further characterized in that said latch means comprises a vertically extending toothed member rigidly supported from one side wall of the pen and engageable by one end of said latch bar.

7. A restraining pen according to claim 1 further characterized in that said means for releasably supporting one edge of said supporting platform comprises:

A. a shaft parallel to the edge of the platform and journaled for rotation under said platform;

B. a plurality of parallel arm members each rigidly attached at one end to said shaft;

C. roller means journaled for rotation in the opposite ends of said arms, said roller means engaging the bottom surface of said platform; and D. means for rotating said shaft.

8. A restraining pen according to claim 1 further characterized in that gate closures are provided at opposite ends of said pen.

9. A restraining pen according to claim 1 further characterized in that:

A. gate closures are provided at opposite ends of said pen;

B. said means for releasably supporting one edge of said supporting platform includes:
1. a shaft parallel to the edge of the platform and journaled for rotation under the platform,
2. a plurality of parallel arm members each rigidly attached at one end to said shaft,
3. roller means journaled for rotation in the opposite end of said arms, said roller means engaging the bottom surface of said platform, and
4. means for rotating the shaft, C. said head restraining means includes:
1. a pair of transverse vertical wall members lying generally in the same plane and extending inwardly from the opposite side walls,
   a. one of said wall members being rigidly secured to said movable panel means for movement therewith, and
   b. the other of said wall members being rigidly secured to the opposite side wall,
2. a V notch formed between the upper edges of said wall members,
3. a head gate member vertically movable in a plane parallel and immediately adjacent to the plane of said wall members, and
4. an inverted shallow V notch formed in the lower edge of said head gate member, D. releasable lock means comprising a horizontally extending, pivotally mounted latch bar on said head gate engageable with a vertically extending, pivotally mounted hook member supported from the top of the pen to hold the head gate in elevated position; and E. releasable latch means comprising a vertically extending toothed member rigidly supported from one side wall of the pen and engageable by one end of said latch bar.

* * * * *

UNITED STATES PATENT OFFICE
CERTIFICATE OF CORRECTION

PO-1050
(5/69)

Patent No. 3,724,027    Dated April 3, 1973

Inventor(s) Chauncey E. Zuber

It is certified that error appears in the above-identified patent and that said Letters Patent are hereby corrected as shown below:

Column 1, line 24, "is", 2nd occ. should read -- in -- .

line 54, "jointed" should be --joined--.

Column 2, line 11, "corners" should be --corner--;

line 17, "extending" should be --extend--;

line 38, "edges" should be --edge--.

Column 3, line 41, after "of", --the-- is omitted.

Signed and sealed this 28th day of August 1973.

(SEAL)
Attest:

EDWARD M. FLETCHER, JR.
Attesting Officer

RENE D. TEGTMEYER
Acting Commissioner of Patents